United States Patent Office 3,519,575
Patented July 7, 1970

3,519,575
METHOD OF PREPARING AN IRON GROUP METAL-TIN CATALYST
John E. Bozik, Plum Borough, and William L. Kehl, Indiana Township, Allegheny County, Pa., assignors to Gulf Research & Development Company, Pittsburgh, Pa., a corporation of Delaware
No Drawing. Filed Nov. 25, 1968, Ser. No. 778,807
Int. Cl. B01j *11/22*
U.S. Cl. 252—472                             10 Claims

ABSTRACT OF THE DISCLOSURE

A method of preparing iron group metal-tin catalysts of controlled composition by intimately mixing the wet precipitates obtained from separate solutions of the metal salts. Hydrogen reduction of the mixture after drying results in an iron group metal-tin alloy with surface area of catalytic magnitude.

---

This invention relates to a novel method of preparing a catalyst comprising an iron group metal-tin alloy in accurate predetermined ratios.

Certain alloys of tin with an iron group metal possess significant catalytic activity. One requirement of a catalytically useful alloy is that it possess a surface area of catalytic magnitude. In making a catalyst of this type, such as a nickel-tin alloy, it was found that alkaline coprecipitation from a solution containing an iron group metal salt and a tin salt followed by hydrogen reduction of the precipitate produced an iron group metal-tin alloy of significant catalytic properties. However, in attempting to make multiple batches of this type of catalyst, it was discovered that the described method was non-reproducible. That is, a catalytically active alloy of predetermined composition and characteristics could not be consistently produced, or stated otherwise in starting with a known composition of dissolved salts, the composition and characteristics of the alloy could not be accurately predicted. We believe that these erratic results were at least in part caused by the partial solubility of one or more of the metals in the presence of the alkaline precipitant, such as alkali metal hydroxide or ammonium hydroxide.

Since a catalyst of a specific predetermined composition and characteristics is ordinarily required in any commercial operation, it is essential that the process utilized for producing a commercial catalyst must consistently result in a catalyst product of substantially uniform predetermined composition and characteristics. In an effort to solve this problem we found that it is possible to make a metallic iron group metal-tin product having a significant surface area and a composition consistent with the starting composition by thoroughly mixing and then reducing powdered compounds of the desired metals. In this procedure a powdered reducible compound of an iron group metal and a powdered reducible compound of tin are thoroughly mixed either dry or as a wet paste and the mixture is then reduced in hydrogen after drying and calcining. However, the reduced product is of poor catalytic quality apparently because of a substantial quantity of free iron group metal and free tin metal and too little of the iron group metal-tin alloy and also due to a lower surface area than is obtained from the co-precipitation technique.

Despite these adverse results, we unexpectedly discovered that suitable catalytically active alloys of nickel and tin can be produced with consistent uniformity of composition. We found that this can be accomplished if the separately precipitated compounds of an iron group metal and tin are thoroughly wet mixed prior to drying the mixed precipitates. The most convenient manner of carrying out this procedure is the separate precipitation of an iron group hydroxide from a solution of a suitable salt of the metal and tin hydroxide from a solution of a tin salt, mixing of the two precipitates while still wet, drying the mixture, calcining, and then reducing the mixture in hydrogen.

This procedure results in a product which possesses a surface area of catalytic magnitude containing a substantial quantity of the desired iron group metal-tin alloy and one which is consistently uniform in composition and characteristics from batch to batch. In following this procedure it is important that the iron group metal and tin metal are recovered as solidified compounds from separate solutions of the metals such as by precipitation and that they are then thoroughly mixed prior to denying either precipitate. If the metals are co-precipitated, the results are unpredictable as explained. If separate, dried precipitates of the compounds are thoroughly mixed even in the wet state a less homogeneous final material having a lower surface area with significantly inferior catalytic properties is obtained than is obtained when the non-dried precipitates are wet mixed.

We prefer to mix freshly precipitated compounds of the metals; however, this is not essential, provided that the precipitates are not dried out between their formation and mixing. In some instances it is more convenient to separately store one or more of the precipitates in the wet state for future use in accordance with this invention. We describe the precipitation of the iron group metal compound and the tin compound from separate solutions containing the metals. This is intended to include those procedures in which the precipitates settle out from the solution as well as those procedures which from finely divided solid particles that remain suspended in the liquid for extended periods without settling out. These suspended precipitates can be recovered for use by filtration, centrifugation or other suitable procedure.

The composition prepared by the method described herein is substantially homogeneous and is predominantly a solid solution of iron group metal and tin. As used herein the terms alloy and solid solution are used interchangeably to mean the same material, that is, an intimate atomic or near atomic mixture of the iron group metal and tin metal including inter-metallic compounds. This process can be used to make iron group metal-tin alloys of any desired composition, however, it is more likely that a catalyst would be desired within the range of about 15 to 99 mol percent of the iron group metal.

In describing this invention we have referred to our alloys as having a surface area of catalytic magnitude. By the expression surface area of catalytic magnitude we mean that the alloy must be in a physical form such that its surface is sufficiently large that it is capable of exhibiting a significant catalytic effect. For example, a one gram sphere of an equimolar solid alloy of nickel and tin possesses almost no surface area (i.e. about 0.001 $M^2/g$). However, to have a surface area of catalytic magnitude, the surface area must be at least 0.1 $M^2/g$. and more preferably at least 1.0 $M^2/g$. in order that sufficient area of the catalyst is presented to the reacting species to provide a significant catalytic effect.

The catalytically active composition can be prepared either as an unsupported or as a supported catalyst. If a support is employed, any solid inert material can be used which has poor cracking characteristics. Such materials are well known in the art and include low surface area silica, high surface area silica, low and high surface area aluminas, silica-aluminas which are treated as by steaming to reduce their cracking activity, magnesia, etc., and combinations of these materials. The supported catalyst"

can readily be prepared with a surface area in the range from about 0.1 square meters per gram ($M^2/g$.) to about 500 $M^2/g$. The unsupported catalyst can readily be prepared with a surface area in the range from about 0.1 $M^2/g$. to about 50 $M^2/g$. The supported catalyst in the higher range of surface area is pyrophoric and for this reason adequate precaution must be exercised in its use.

When a support is used, the wet iron group metal and tin precipitates are wet mixed with the support material. Preferably the iron group metal and tin precipitates are wet mixed together prior to mixing them with the support. The mixture is then dried, calcined and reduced to form the catalytically active alloy material. Both the supported and the unsupported catalyst can be formed into pellets, extrudates, etc., preferably preceding the reduction step.

In making the iron group metal precipitate, the iron group metal salt employed is preferably the metal nitrate or an iron group organo-metallic compound, such as the acetate, carbonate, benzoate, etc., however, any salt can be employed that is readily dissolved or dispersed in a suitable organic or inorganic solvent, such as water, dimethylformamide, lower alkyl alcohols, etc., and after being dissolved will yield a precipitate of the desired iron group metal when reacted with an appropriate base.

To the solution of the iron group metal salt a suitable base is added to form a precipitate. The base can be any compound which yields hydroxyl ions in the solution. Typically the base would be the hydroxide of an alkali metal, such as lithium, sodium, potassium, etc. or ammonia. Sodium hydroxide is the preferred base because of its low cost and general availability. Ammonium hydroxide is not a preferred base to be used with the iron group metals as it tends to form a stable soluble ammino complex which must be boiled extensively to convert to a precipitate of the desired hydroxide. The alkali metal hydroxide is preferably added in excess to insure substantially complete precipitation of the iron group metal compound. At this point it is usually desired to separate the precipitate from the liquid solution by filtration. Any convenient means of separating the precipitate and the liquid can be used as earlier indicated; filtration being used as illustrative only. It is then preferred to wash the precipitate to remove any alkali metal remaining in contact with the precipitate since this alkali metal would otherwise interact with the iron group metal during calcination to form an undesirable impurity in the reduced iron group metal-tin catalyst.

In making the tin precipitates, it is preferred to use those tin salts which can be conveniently dissolved or dispersed in a suitable organic or inorganic solvent, e.g. dimethylformamide, water, lower alkyl alcohols, etc. Suitable tin salts include but are not limited to the tin halides, such as stannic chloride, stannic bromide, stannous chloride and organo tin salts, such as stannous acetate, stannous oxalate, dicyclopentadienyl tin (II) and dibenzyl-diethylstannate.

The salt $SnCl_4 \cdot 5H_2O$ is preferred for its relatively low cost and availability but selection of a particular salt is not critical. To a solution of the tin salt, a suitable base is added to form a precipitate. The base can be any compound which yields hydroxyl ions in the liquid solution. Typically the base would be the hydroxide of an alkali metal such as lithium, sodium, potassium, etc., or ammonia. When sodium hydroxide is used great care must be exercised to insure that only a stoichiometric quantity of the base is used as any excess tends to redissolve the tin hydroxide as it is formed. Ammonium hydroxide is the preferred base because in this instance, unlike the situation with the iron group metal, no stable ammino compounds are formed and excess ammonium hydroxide can be added without redissolving the precipitate as it is formed.

It is preferred to add an excess of the alkali metal hydroxide to insure substantially complete precipitation of the tin compound. At this point it is usually convenient as indicated in the case of the iron group metal precipitate to filter and wash the precipitate formed in the previous step. However, it should be noted that when the preferred base, ammonium hydroxide, is used the residual ammonia compound remaining on the precipitate is volatile and vaporizes when the compound is heated and calcined. In commercial operations it is desirable to remove the ammonia by washing rather than vaporization to permit its recovery and to prevent air pollution.

After the separate precipitates are obtained, they are mixed together while wet to achieve maximum catalytic properties. As we have previously pointed out, it has been found that the precipitates should not be dried before they are mixed together. Any liquid that will wet the individual particles of each precipitate without significantly dissolving them is suitable for use in mixing the precipitates. This liquid used for mixing the two precipitates can be the same as the solvent used in their precipitation. If the mixing liquid is different than the one or both of the solvents used for the precipitation, it should be miscible with the solvent.

The mixture of precipitates is then dried and calcined. The drying and calcining steps can be combined or performed separately. The mixture is dried in order to drive off all uncombined water at a temperature such as about 90 to 130° C. for 3–16 hours. The dried mixture is then calcined at conditions which will drive off substantially all of the combined water such as at 400 to 600° C. for 4–16 hours. It has been found that prolonged calcination promotes the formation of the desired alloy.

The composition after calcining is reduced with hydrogen to transform substantially all of the iron group metal and tin to the metallic state. Suitable reduction conditions include passing hydrogen over the composition at temperatures of about 375° C. for about three hours. Since the reduction is a time-temperature function, these two variables must be correlated to obtain substantially complete reduction of the metals. The temperature must be at least about 250° C. and preferably about 300° C. and should be no higher than about 800° C., preferably 550° C.

The following examples are introduced to illustrate further the novelty and utility of the present invention but not with the intention of unduly limiting the same.

EXAMPLE 1

A sample of 21.06 grams $SnCl_4 \cdot 5H_2O$ was dissolved in 50 cc.'s water and 90 cc.'s of a 10% aqueous sodium hydroxide solution was added to form a precipitate. Care was taken to avoid an excess of sodium hydroxide since this precipitate tended to redissolve. The precipitate was filtered by suction and washed several times with water. Then 42.84 grams of $NiCl_2 \cdot 6H_2O$ was dissolved in 50 cc.'s of water. An excess of approximately 500 cc.'s of 10% sodium hydroxide was added. The precipitate was filtered and washed. The two precipitates were collected while wet, mixed together thoroughly and refiltered. The thus mixed precipitates were dried in air at 130° C. for four hours and reduced in a hydrogen atmosphere between 350–500° C. for a time of four hours resulting in a catalyst having a nickel:tin ratio of 3:1.

EXAMPLE 2

A sample of 21.06 grams $SnCl_4 \cdot 5H_2O$ was dissolved in 50 cc.'s water and a precipitate was formed by the addition of 150 cc.'s of a 50% aqueous solution of ammonium hydroxide. This precipitate was filtered by suction and washed several times with water. Next 42.84 grams $NiCl_2 \cdot 6H_2O$ was dissolved in 50 cc.'s water and an excess of approximately 500 cc.'s of 10% aqueous sodium hydroxide was added to form the precipitate. This nickel precipitate was filtered and washed. The two precipitates were collected while wet, mixed together thoroughly in water, and refiltered. This was followed by drying in air at 130° C. for four hours. The thus dried precipitates were calcined in air at 500° C. and then reduced in a hydrogen atmosphere at 250–400° C. Crystalline phases of the free metals are observed in only minor concentrations and the predominance of the material formed is of the nickel-tin alloy.

Alloy materials as described herein are catalytically active. For example, a nickel-tin alloy material having a nickel to tin molar ratio of 3 and a surface area of 6.9 $M^2/g$. was used for the catalytic dehydrogenation of cyclohexanone to phenol. Cyclohexanone was passed over a bed of the catalyst at a temperature of 375° C. and a liquid hourly space velocity of 1.2 $hr.^{-1}$. The cyclohexanone was converted at a conversion rate of 67 mol percent and a selectivity of 73 mol percent to phenol. Other nickel-tin alloy compositions exhibited an equivalent catalytic effect.

Resort may be had to such variations and modifications as fall within the spirit of the invention and the scope of the appended claims.

We claim:

1. A method of preparing an iron group metal-tin catalyst of controlled composition and catalytic surface area comprising the steps, adding a first base to a solution of an iron group metal salt whereby a first wet precipitate is formed, adding a second base to a solution of a tin salt to form a second wet precipitate, intimately mixing the said wet precipitates, drying the resulting mixture, calcining said mixture, and reducing said mixture with hydrogen at an elevated temperature whereby the metals are reduced to the metallic state as a substantially homogeneous iron group metal-tin alloy.

2. A method in accordance with claim 1 wherein the intimately mixed, wet precipitates are combined with an inert support.

3. A method in accordance with claim 1 wherein said first base and said second base is an alkali metal hydroxide.

4. A method in accordance with claim 3 wherein the alkali metal hydroxide is sodium hydroxide.

5. A method in accordance with claim 1 wherein the said first base is an alkali metal hydroxide and the said second base is ammonium hydroxide.

6. A method in accordance with claim 5 wherein the said alkali metal hydroxide is sodium hydroxide.

7. A method in accordance with claim 1 wherein the said iron group metal is nickel.

8. A method in accordance with claim 6 wherein said iron group metal is nickel.

9. A method in accordance with claim 1 wherein said solution of iron group metal salt and said solution of tin salt is an aqueous solution.

10. A method in accordance with claim 8 wherein said solution of iron group metal salt and said solution of tin salt is an aqueous solution.

References Cited

UNITED STATES PATENTS

| 2,480,494 | 8/1949 | Mathy | 196—52 |
|---|---|---|---|
| 298,365 | 5/1884 | Farrel | 75—129 |
| 2,375,506 | 5/1945 | Turck | 75—0.5 |

DANIEL E. WYMAN, Primary Examiner

P. M. FRENCH, Assistant Examiner

U.S. Cl. X.R.

252—461, 466